(12) United States Patent
Shimosato (10) Patent No.: US 8,525,892 B2
(45) Date of Patent: Sep. 3, 2013

(54) IMAGING APPARATUS AND CONTROL METHOD THEREFOR

(75) Inventor: Jiro Shimosato, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1042 days.

(21) Appl. No.: 11/406,951

(22) Filed: Apr. 18, 2006

(65) Prior Publication Data
US 2006/0238622 A1   Oct. 26, 2006

(30) Foreign Application Priority Data
Apr. 21, 2005 (JP) .................. 2005-123986

(51) Int. Cl.
H04N 5/225 (2006.01)
(52) U.S. Cl.
USPC ........................ 348/220.1; 348/345
(58) Field of Classification Search
USPC ...................... 348/220.1, 364, 345
See application file for complete search history.

(56) References Cited

U.S. PATENT DOCUMENTS
| | | | | |
|---|---|---|---|---|
| 6,249,317 | B1 * | 6/2001 | Hashimoto et al. | 348/364 |
| 2001/0028402 | A1 * | 10/2001 | Sugimoto et al. | 348/345 |
| 2004/0223073 | A1 * | 11/2004 | Kanai | 348/345 |
| 2004/0263674 | A1 * | 12/2004 | Koreki | 348/345 |
| 2005/0031325 | A1 * | 2/2005 | Fujii | 396/54 |
| 2006/0008264 | A1 * | 1/2006 | Yamaguchi et al. | 396/121 |

FOREIGN PATENT DOCUMENTS
| | | | |
|---|---|---|---|
| JP | 10-285455 | * | 10/1998 |
| JP | 2004-205884 | * | 7/2004 |
| WO | 2005/002212 | | 1/2005 |
| WO | WO2005/002212 | * | 1/2005 |

OTHER PUBLICATIONS

Chinese Office Action dated Oct. 19, 2007 concerning corresponding Chinese Patent Application No. CN200610077763.1 and English text of same.*

Chinese Office Action dated Oct. 19, 2007 concerning corresponding Chinese Patent Application No. 200610077763.1 and English text of same.

* cited by examiner

Primary Examiner — Roberto Velez
Assistant Examiner — Yih-Sien Kao
(74) Attorney, Agent, or Firm — Canon U.S.A., Inc. IP Divison (57) ABSTRACT

In an imaging apparatus that enables still image shooting during movie recording in a movie recording mode, a first AF area to be focused is set in a imaging field, in still image shooting in a still image shooting mode, and focus control is implemented by utilizing the first AF area. In movie recording in the movie recording mode, focus control is implemented, by utilizing a second AF area that is set independently from the first AF area. In the case where, during the movie recording, still image shooting is instructed, focus control for the still image shooting is implemented, based on the second AF area instead of the first AF area.

8 Claims, 8 Drawing Sheets

IMAGING APPARATUS AND CONTROL METHOD THEREFOR

FIELD OF THE INVENTION

The present invention relates to an imaging apparatus that can record both moving images and still images, and more particularly to an imaging apparatus that can implement still image shooting during movie recording.

BACKGROUND OF THE INVENTION

In recent years, as an imaging apparatus such as an electronic camera, products having both a still image shooting function and a movie recording function have been developed. Some of these electronic cameras can implement still image shooting during movie recording. In general, automatic focusing control during movie recording is rougher than that during still image shooting. Accordingly, in order to raise the quality of a still image in the case of still image shooting during movie recording, shooting has to be implemented with automatic focusing control for still image shooting.

For example, in Japanese Patent Laid-Open No. 10-285455, a method is disclosed in which, in a video camera that can implement imaging and recording of both moving images and still images, exposure control for still image shooting is implemented by utilizing range information, on a photographic subject, in the case of the immediate previous movie recording. However, because, as described above, automatic focusing control for still image shooting is required to be more accurate than automatic focusing control for movie recording is, a configuration cannot be employed in which range information for movie recording is utilized.

Moreover, with regard to still image shooting, a configuration is known in which automatic focusing control is implemented by selectively utilizing one out of a plurality of AF-frame positions. Still moreover, in Japanese Patent Laid-Open No. 10-285455, a configuration is disclosed in which, by utilizing a touch panel, the user sets the AF frame at a desired position, whereby focusing on an user-intended place is enabled. According to the foregoing configuration, the user can set a desired AF-frame position in still image shooting. During movie recording however, in most cases, the AF-frame position is fixed at the middle of an imaging field.

As described above, with regard to still image shooting, the configuration is well known in which the user can select or specify the AF-frame position, and with regard to movie recording, the configuration is well known in which the AF-frame position is fixed at the middle portion of an imaging field. In addition, in the case where, during movie recording, still image shooting is implemented, it is desirable that, in order to simplify the configuration, regular processing, including automatic focusing control, for still image shooting is carried out. However, in the case where automatic focusing control for still image shooting is implemented during movie recording, focusing may be implemented off the place where the user has intended during the movie recording, if the AF-frame position is fixed at any portion other than the middle of the image screen. In still image shooting during movie recording, the movie recording is still being implemented while focus control for the still image shooting is carried out through a so-called halfway press on a shutter button. In consequence, focusing on the area unintended by the user causes a malfunction in which the focus for the movie recording is misadjusted.

The malfunction may be coped with through a method in which, in still image shooting, the user can arbitrarily select the AF-frame position, for example, by utilizing a configuration disclosed in Japanese Patent Laid-Open No. 2004-205884. In general however, in most cases, the user suddenly intends to implement still image shooting during movie recording. Accordingly, if the user implements the settings at every still image shooting, he may miss the right time to take a picture. Moreover, it is wearisome to change the AF-frame position each time the photographic subject changes.

SUMMARY OF THE INVENTION

The present invention has been implemented in consideration of the foregoing issues and provides a shooting technique in which, in the case of still image shooting during movie recording, focusing on a user-intended photographic subject is readily enabled.

According to one aspect of the present invention, there is provided an imaging apparatus that enables still image shooting during movie recording in a movie recording mode, the imaging apparatus comprising: a first focusing unit configured to, in still image shooting in a still image shooting mode, setting in an area corresponding to a shooting angle a first AF area to be focused and control focus; and an AF area setting unit configured to set a second AF area that is larger than the first AF area, in the case where still image shooting in the movie recording mode is instructed and focus control is implemented.

According to another aspect of the present invention, there is provided an imaging method that enables still image shooting during movie recording in a movie recording mode, the imaging method comprising the steps of: a first focusing step of, in still image shooting in a still image shooting mode, setting in an area corresponding to a shooting angle a first AF area to be focused and controlling focus; and an AF area setting step of setting a second AF area that is larger than the first AF area, in the case where still image shooting in the movie recording mode is instructed and focus control is implemented.

Furthermore, according to another aspect of the present invention, there is provided a control method for an imaging apparatus that enables still image shooting during movie recording in a movie recording mode and has an image display unit, the control method comprising the steps of: a setting step of setting and maintaining a first AF area for automatic focusing control in still image shooting; a first display step of, in still image shooting in a still image shooting mode, displaying on the image display unit a mark indicating the first AF area; a focusing step of, in movie recording in the movie recording mode, controlling focus, by utilizing a second AF area that is independent from the first AF area; and a second display step of displaying on the image display unit a mark indicating the second AF area in place of the first AF area, in the case where, during the movie recording, still image shooting is instructed.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodi

DETAILED DESCRIPTION OF THE PREFERRED EMBODIMENTS

Preferred embodiments of the present invention will now be described in detail in accordance with the accompanying drawings.

In the present embodiment below, a case will be explained in which the present invention is applied to a digital camera; however, the present invention can be applied to an arbitrary apparatus, such as a cellular phone, a PDA, and a video camera, utilizing an imaging apparatus that enables movie recording and still image shooting and has an automatic focusing function.

Figure 1:
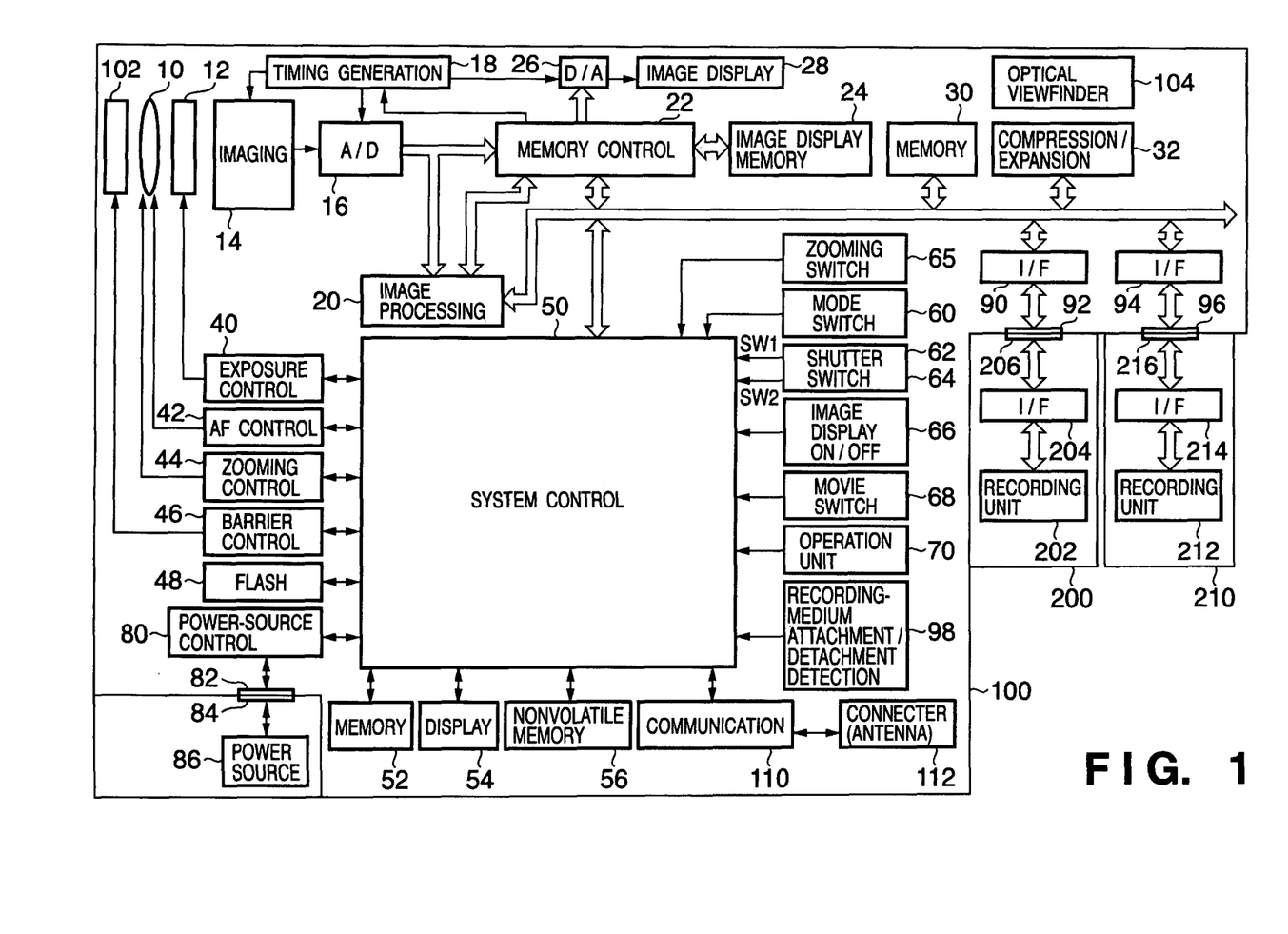
- FIG. 1 is a block diagram illustrating a configuration example of an electronic camera according to the present embodiment.

FIG. 1 is a block diagram illustrating the configuration of an electronic camera according to the present embodiment. An electronic camera 100 is configured so as to take an image of a photographic subject, through an optical system (an imaging lens) 10. By forming the optical system 10 with a zoom lens (a lens that can change the shooting angle), an optical zooming function can be provided. Moreover, the electronic camera 100 can be configured so as to further have an electronic zooming function obtained by electronically cutting off an image picked up by an image pickup device 14. In addition, in some cases, the electronic camera 100 is configured so as to have either an optical zooming function or an electronic zooming function. Additionally, the optical system 10 may be interchangeable. In this case, a driving mechanism for changing the zoom ratio may be mounted in the optical system 10 or on the main body of the electronic camera 100. In the case where the driving mechanism is mounted in the optical system 10, the driving mechanism in the optical system 10 drives a lens for changing the zoom ratio, in accordance with an electric signal that is sent from the main body of the electronic camera 100 to the optical system 10, whereby a zooming function is provided. In addition, the driving mechanism that drives a lens mechanically, for changing the zoom ratio, in the optical system 10 may be provided on the main body of the electronic camera 100.

Light (light that enters through the optical view angle), from a photographic subject, that passes through the optical system (image pickup lens) 10 forms an optical image of the photographic subject on the image pickup plane of an image pickup device (such as a CCD sensor and a CMOS sensor) 14, after passing through the opening of a shutter 12 having a diaphragm mechanism. The image pickup device 14 converts the optical image into an electric analogue image signal and implements output of the analogue image signal. An A/D converter 16 converts the analogue image signal supplied by the image pickup device 14 into a digital image signal. The image pickup device 14 and the A/D converter 16 are controlled by a clock signal and a control signal supplied by a timing generation circuit 18. The timing generation circuit 18 is controlled by a memory control circuit 22 and a system control circuit 50.

An image processing circuit 20 applies image processing, such as pixel interpolation processing and color conversion processing, to image data (a digital image signal) supplied by the A/D converter 16 or by the memory control circuit 22. Additionally, based on the data for an image picked up by the image pickup device 14, the image processing circuit 20 computes data items for TTL (through-the-lens)-method AF (automatic focusing) processing, AE (automatic exposure) processing, and EF (automatic light control through pre-flashing) processing, and supplies the system control circuit 50 with the computation result. The system control circuit 50 controls an exposure controller 40 and an AF controller 42, based on the computation result, thereby realizing an automatic exposure function and an automatic focusing function. Moreover, the image processing circuit 20 also implements TTL-method AWB (automatic white balancing) processing, based on the data for an image picked up by the image pickup device 14. A memory 52 stores constants, variables, programs, and the like for operating the system control circuit 50.

The memory control circuit 22 controls the A/D converter 16, the timing generation circuit 18, the image processing circuit 20, an image display memory 24, a D/A converter 26, a memory 30, and a compression/expansion circuit 32. The image data outputted by the A/D converter 16 is written in the image display memory 24 or the memory 30, by way of the image processing circuit 20 and the memory control circuit 22, or by way of the memory control circuit 22, without passing through the image processing circuit 20.

The image data, to be displayed, that has been written in the image display memory 24 is converted by the D/A converter 26 into an analogue image signal and supplied to an image display unit 28. As a result, the picked up image is displayed on the image display unit 28. By continuously displaying picked up images on the image display unit 28, an electronic viewfinder (EVF) function is realized. The display on the image display unit 28 may arbitrarily be turned on or turned off through an instruction from the system control circuit 50.

Turning on or off of the display is instructed by an image display ON/OFF switch 66. By utilizing the electronic camera 100, with the display on the image display unit 28 turned off, the power dissipation in the electronic camera 100 can significantly be reduced.

The memory 30 is utilized to store still images and moving images that are picked up (picked up as images to be recorded in a recording medium). The capacity and the access speed (writing and reading speeds) of the memory 30 may arbitrarily be decided; however, in order to enable "panorama shooting" and "burst shooting" in which a plurality of still images is picked up in series, the capacity and the access speed commensurate with the foregoing shooting modes should be provided. Moreover, the memory 30 is utilized as a work area for the system control circuit 50.

The compression/expansion circuit 32 is a circuit that compresses and expands image data, through the adaptive discrete cosine transform (ADCT) or the like; the compression/expansion circuit 32 reads and applies compression/expansion processing to image data stored in the memory 30. The data image processed in the compression/expansion circuit 32 is written in the memory 30.

The exposure controller 40 controls the shutter 12 having a diaphragm function, based on information supplied from the system control circuit 50. Moreover, the exposure controller 40 also has a flash-light control function, in coordination with a flash (light-emitting device) 48. In addition, the flash 48 has a flash-light control function and a light-projection function for AF auxiliary light. The AF controller 42 controls the focusing lens of the optical system 10, based on information supplied from the system control circuit 50. A zooming controller 44 controls zooming by the optical system 10. A barrier controller 46 controls the operation of a barrier 102 that protects the optical system 10.

A display unit 54 has an LCD and an LED, implements various displays under the control of the system control circuit 50, and notifies the user of the operation condition of the camera and the like. In addition, part of the display unit 54 is provided inside an optical viewfinder 104.

Information items, among items that are displayed on the display unit 54, that are displayed on the LCD and the like include, for example, a single-frame shooting/burst shooting display, a self-timer display, a compression-rate display, a recording-pixel number display, a recorded-shot number display, a remaining-shot number display, a shutter speed display, a diaphragm value display, an exposure correction display, a flash display, a red-eye reduction display, a macro shooting display, a buzzer setting display, a clock-battery remaining level display, a battery remaining level display, an error display, information display through multiple-digit numerals, an attached/detached condition display for recording media 200 and 210, a communication I/F operation display, a date/time display, and the like. In addition, information items among items that are displayed on the display unit 54, that are displayed in the optical viewfinder 104 include, for example, a focus display, a camera-shake warning display, a flash charging display, a shutter speed display, a diaphragm value display, an exposure correction display, and the like.

A nonvolatile memory 56 is a memory, such as an EEPROM, that is electrically erasable and writable.

A first shutter switch (SW1) 62 is turned on in process of operating (with a halfway press on) a shutter button 310 (illustrated in FIG. 2), and instructs the system control circuit 50 to start AF (automatic focusing) processing, AE (automatic exposure) processing, AWB (automatic white balancing) processing, EF (pre-flashing) processing, and the like. A second shutter switch (SW2) 64 is turned on at the end of operating (with a complete press on) a shutter button 310 (illustrated in FIG. 2), and instructs the system control circuit 50 to start a series of still-image shooting processing. The series of still-image shooting processing includes the following: (1) Processing in which an image signal is read from the image pickup device 12, converted by the A/D converter 16 into image data, processed by the image processing circuit 20, and written in the memory 30, by way of the memory control circuit 22; and (2) Processing in which image data is read from the memory 30 and compressed in the compression/expansion circuit 32, and the compressed image data is written in the recording medium 200 or 210.

Figure 2:
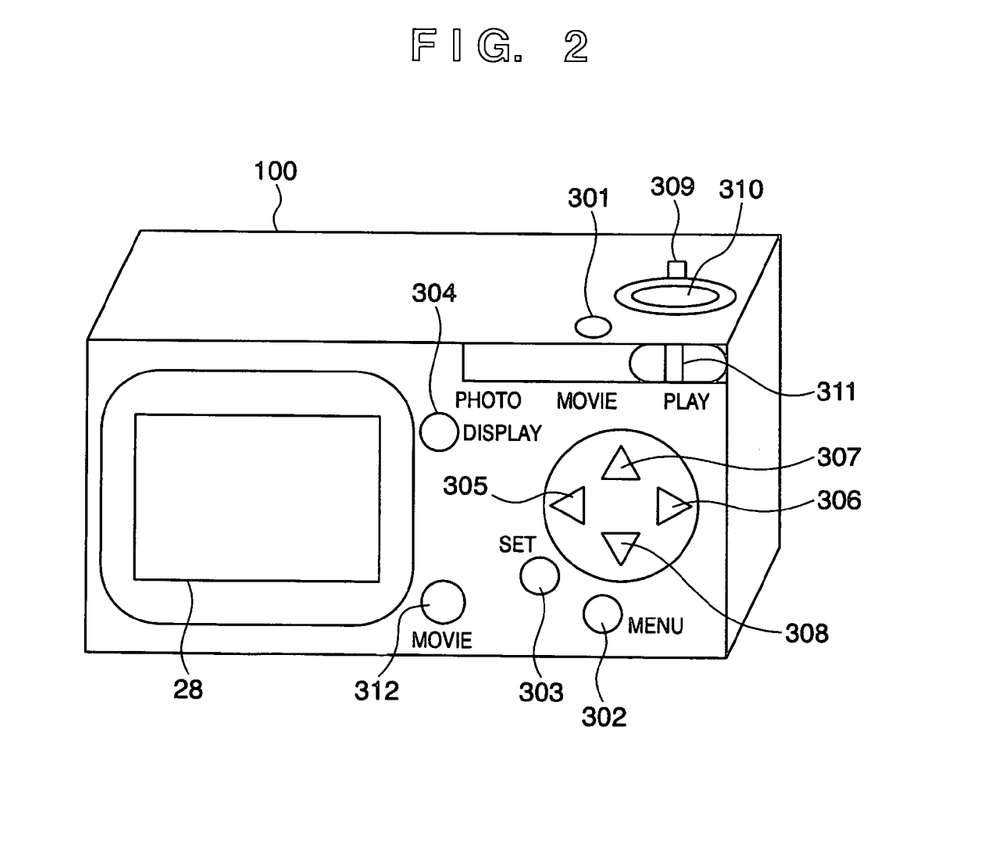
FIG. 2 is a view illustrating an example of an exterior configuration of the electronic camera illustrated in FIG. 1.

A movie switch 68 is turned on or off, through operation of a movie button 312 (illustrated in FIG. 2). The movie switch 68 toggles between a video-recording start and a recording standby. When the video-recording start is instructed, as is the case with still images, picked up moving images are written in the recording medium 200 or 210. In addition, as is the case with the shutter switches 62 and 64, a halfway-press function may be provided to the movie switch 68. In other words, a halfway press on the movie button 312 instructs the system control circuit 50 to start AF (automatic focusing) processing, AE (automatic exposure) processing, AWB (automatic white balancing) processing, EF (pre-flashing) processing, and the like. Then, a complete press on the movie button 312 instructs the system control circuit 50 to start a series of movie recording processing. The series of movie recording processing includes the following: (1) Processing in which an image signal is read from the image pickup device 12, converted by the A/D converter 16 into image data, processed by the image processing circuit 20, and written in the memory 30, by way of the memory control circuit 22; and (2) Processing in which image data is read from the memory 30 and compressed in the compression/expansion circuit 32, and the compressed image data is written in the recording medium 200 or 210. In addition, the system control circuit 50 determines, through the state of a mode switch 60, whether movie recording is instructed or whether still image shooting is instructed, and controls each of shooting control units and recording units.

A zooming switch 65 is an operation unit that is operated by a camera user, in order to change the shooting angle (the zooming magnification or shooting magnification). For example, the zooming switch 65 is configured of a slide-type operation member or a lever-type operation member and a switch or a sensor that detects the operation of the member.

An operation unit 70 includes buttons and switches 301 to 310 illustrated in FIG. 2, and is utilized for turning the power source on or off, setting or changing the shooting condition, ascertaining the shooting condition, ascertaining the condition of the electronic camera 100, or checking picked up images.

A power-source control unit 80 includes, for example, a power-source detection circuit, a DC-to-DC converter, a switching circuit for switching blocks to be supplied with electric power, and the like. The power-source control unit 80 detects whether or not the power source remains, the kind of the power source, the battery remaining level, and in accordance with the determination result and the instruction from the system control circuit 50, controls the DC-to-DC converter so as to supply each of the blocks with a required voltage for a necessary duration. The main body of the electronic camera 100 and a power source 86 have connecters 82 and 84, respectively, and are connected with each other, through these connecters. The power source 86 is, for example, a primary battery such as an alkaline battery or a lithium battery, a secondary battery such as a NiCd battery or a NiMH battery, an AC adapter, or the like.

The recording media 200 and 210 are connected by way of connecters 206 and 216 to respective connecters 92 and 96 on the main body of the electronic camera 100. The recording media 200 and 210 include, for example, respective recording units 202 and 212 such as a semiconductor memory or a hard disc, and respective interfaces 204 and 214. In addition, the recording media 200 and 210 are connected to a buss line inside the electronic camera 100, by way of respective interfaces 90 and 94 in the main body of the electronic camera 100. A recording-medium attachment/detachment detector 98 detects whether or not the recording medium 200 is connected to the connecter 92 and whether or not the recording medium 210 is connected to the connecter 96. In addition, in the present example, a case is explained in which two systems of connecters and interfaces to attach recording media exist; however, one system, or three or more systems of connecters and interfaces may exist. In the case where a plurality of systems consisting of interfaces and connecters is provided, each system may have specification different from one another. As the interface and the connecter, for example, standard-compliant devices such as a PCMCIA card or a CF (compact flash: a trade mark) card may be employed.

In addition, as the interfaces 90 and 94 and the connecters 92 and 96, standard-compliant devices such as a PCMCIA card or a CF (compact flash: a trade mark) card may be employed. In this case, connection of various communication cards, such as a LAN card, a MODEM card, a USB card, an IEEE1394, a P1284 card, a SCSI card, or a PHS card, enables mutual transfer, of image data and management information associated with image data, between the electronic camera and a peripheral apparatus such as a computer or a printer.

The optical viewfinder 104 enables shooting, without utilizing an electronic viewfinder function provided by the image display unit 28. As described above, in the optical viewfinder 104, display elements that configure part of the display unit 54, e.g., display elements that implement a focus display, a camera-shake warning display, a flash charging display, a shutter speed display, a diaphragm value display, and an exposure correction display may be arranged.

A communication circuit 110 provides various communication functions such as a USB, an IEEE1394, a P1284, a SCSI, a MODEM, a LAN, an RS232C, or wireless communication. A connecter 112 for connecting the electronic camera 100 with another apparatus, or an antenna in the case where a wireless communication function is provided, is connected to the communication circuit 110.

FIG. 2 is a view illustrating an example of the exterior configuration of the electronic camera 100. In addition, in FIG. 2, constituent components that are not necessary to explain the present embodiment are omitted.

The power-source button 301 is a button for initiating or stopping the electronic camera 100, or for turning on or off the main power source for the electronic camera 100. The menu button 302 is a button for setting various shooting conditions and for making the image display unit 28 display menu for displaying the condition of the electronic camera 100. In addition, the menu is configured so as to include a plurality of modes and items that can be set, and/or, a plurality of items whose values can be changed. In this situation, the modes and items that can be set include, for example, a shooting mode (e.g., with regard to decision of exposure, a program mode, a diaphragm priority mode, a shutter speed priority mode, and the like), a panorama shooting mode, a reproduction mode, a multiple-image reproduction/erase mode, a PC connection mode ("PC" denotes a computer such as a personal computer), an exposure correction, a flash setting, a single shooting/burst shooting switching, a self-timer setting, a recording image quality setting, a date/time setting, and protection of recorded images. When the menu button 302 is depressed, the system control circuit 50 makes the image display unit 28 display the menu. In addition, the menu may be displayed superimposed on an image that is being shot, or may be displayed separately (e.g., on a frame of a predetermined background color). When, in the case where the menu is displayed, the menu button 302 is depressed again, the system control circuit 50 makes the image display unit 28 stop display of the menu.

The decision (SET) button 303 is depressed when a mode or an item is decided or selected. When the SET button 303 is depressed, the system control circuit 50 reflects, in the operation of the electronic camera 100, the modes or the items that have been selected prior to the depression.

The left button 305, the right button 306, the top button 307, and the bottom button 308 configure a cross key. The cross key is utilized, for example, for the following purposes: (1) To change an option (e.g., an item or an image), among a plurality of options, that is selected; (2) To change the position of an indicator that specifies the option that is being selected; and (3) To increase or decrease a numeral value (e.g., numeral value that indicates a correction value, a date/time, or the like). In this situation, it is preferable that the user interface is configured in such a way that, by means of the left button 305, the right button 306, the top button 307, and the bottom button 308, two or more items can be selected in addition to the selection of only one item among a plurality of items. For example, the system control circuit 50 is configured so as to recognize that, in the case where, with the SET button 303 depressed, the left button 305, the right button 306, the top button 307, or the bottom button 308 is operated, two or more items that have been designated through the operation are selected.

As described above, the buttons designated by Reference Numerals 301 to 303 and 305 to 308 configure the operation unit 70.

A display (DISPLAY) button 304 is utilized for selecting whether or not the shooting information on a picked up image is displayed, or for switching whether or not the image display unit 28 is made to function as an electronic viewfinder. The DISPLAY button 304 has a function same as that of the image display ON/OFF switch 66.

A shutter button 310 is a button for indicating the shooting operation. As described above, a halfway press on the shutter button 310 instructs the system control circuit 50 to start AF (automatic focusing) processing, AE (automatic exposure) processing, AWB (automatic white balancing) processing, EF (pre-flashing) processing, and the like. In addition, the electron camera 100 is configured in such a way that a complete press on the shutter button 310 instructs the system control circuit 50 to implement shooting.

A mode switchover switch 311 is utilized for switching the mode to one of the playback (PLAY) mode, the movie recording (MOVIE) mode, and the still image (PHOTO) mode. In addition, as the mode changeover switch 311, a slide-type switch has been described; however, a dial switch or another operational system may be employed. As described above, the mode changeover switch 311 functions as the mode switch 60. A movie (MOVIE) button 312 functions as the movie switch 68; when the MOVIE button 312 is depressed during a movie recording mode or still image shooting, movie recording is initiated. As is the case with the shutter button 310, the MOVIE button 312 may be provided with two states, i.e., the halfway press and the complete press, or may be provided with the complete press only. A zoom lever 309 functions as the zooming switch 65.

The automatic focusing control in the electronic camera 100 configured as described above will be discussed below.

Figure 3A:
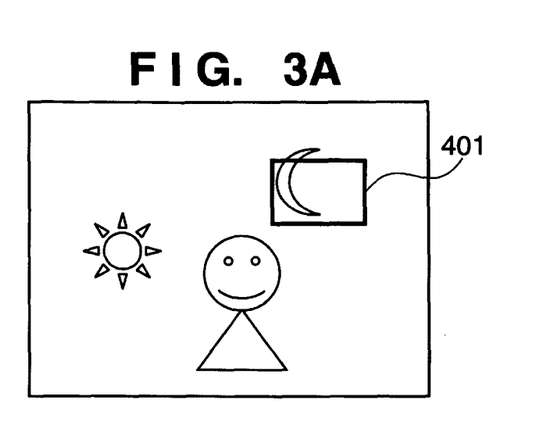
FIG. 3A is a view illustrating an example of a screen in the case of positional control of the AF area, during the still image mode.

In the first place, the focus control in the case of still image shooting during the PHOTO mode will be explained. FIG. 3A is a view illustrating a screen image when the shutter button 310 is halfway depressed during the PHOTO mode. As described above, with a halfway press on the shutter button 310, the automatic focusing control is started; on the EVF of the image display unit 28, an AF frame 401 is displayed that indicates an AF area that, in the automatic focusing control, is utilized for implementing focusing, or in which a focused photographic subject exists. In addition, the AF frame 401 for still image shooting in the PHOTO mode can be shifted to an arbitrary position on the EVF, for example, by, with the shutter button 310 halfway depressed, operating the cross key. Alternatively, through predetermined operation (e.g., specifying a desired position on the EVF of the image display unit 28) at arbitrary timing during the PHOTO mode, the AF frame 401 can be shifted to an arbitrary position. In FIG. 3A, a condition is displayed in which the AF frame 401 has been shifted from the middle to the top-right portion of the imaging field. The automatic focusing control is implemented, based on image information for the image within the AF frame 401.

Figure 4:
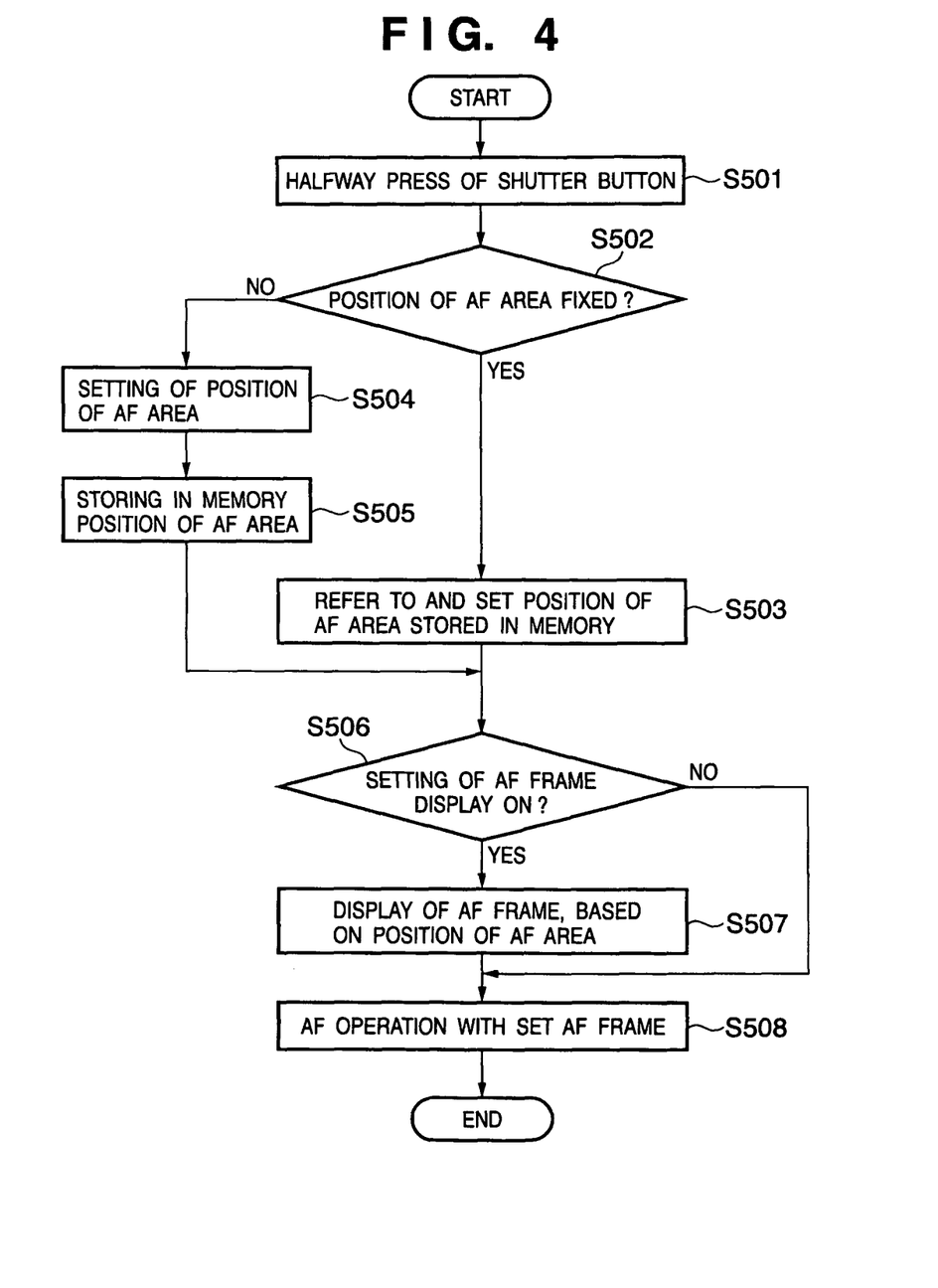
FIG. 4 is a flowchart for explaining automatic focusing control, during the still image mode, according to the present embodiment.

FIG. 4 is a flowchart for explaining the automatic focusing control by the system control circuit 50 when, during the PHOTO mode during the still image mode, the shutter button 310 is halfway depressed.

In the step S501, when, during the PHOTO mode, a halfway press on the shutter button 310 is detected, the system control circuit 50 determines, in the step S502, whether the position of an AF area is fixed or manually adjustable. The "fixed/manual" setting of the AF-area position is implemented, for example, by utilizing an operation menu of the image display unit 28. In the case where the position of the AF area is fixed, the processing proceeds from the step S502 to the step S503; the system control circuit 50 reads the setting value, for the position of the AF area, stored in the memory 30 and decides the position of the AF frame.

Figure 6:
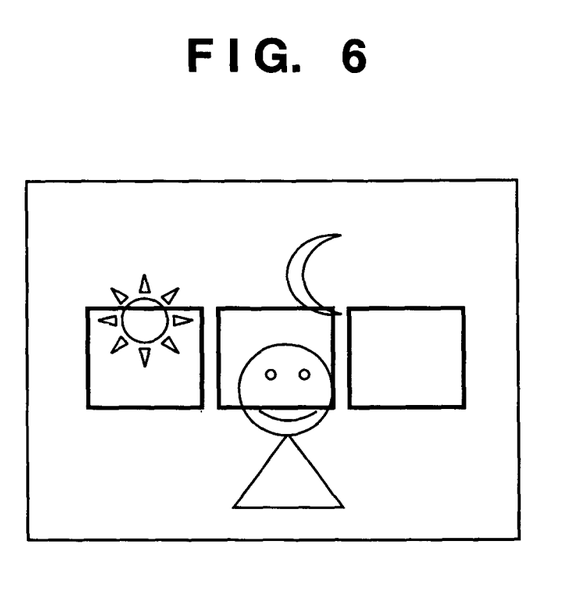
FIG. 6 is a view illustrating an example of AF-frame display through multiple-point AF.

In contrast, in the case of manual setting, the processing proceeds from the step S502 to the step S504; the system control circuit 50 awaits input, by the user, for AF-area position setting. In addition, any method may be employed as an operating and inputting method for setting the position of the AF area, as long as the method is provided with a device for shifting the AF frame. For instance, by utilizing the respective buttons 305 to 308 of a cross key, or by mounting a touch panel on the display unit 28 and touching the display unit 28, the AF-area position setting may be realized. Moreover, by utilizing a line-of-sight detection function, the AF area may be positioned to the position of a photographic subject being viewed by the user. Additionally, the AF frame may be shifted, by manually selecting one out of previously set AF frames as illustrated in FIG. 6. When the user completes setting and inputting of AF-area position, the system control circuit 50 stores, in the step S505, the setting value for the AF-area position, in the memory 30. Accordingly, when, in the following shooting, the AF-frame is in the "fixed" position, the AF-frame position that has been decided through the last manual operation is to be referred to, in the step S503. In addition, in FIG. 6, the electronic camera is configured in such a way that three AF-frame positions are to be focused or three focused AF areas are set; however, the number of the AF-area positions is not limited to three, but may be five, nine, or so on.

When, as described above, the AF-area position control is completed, the processing proceeds to the step S506; the system control circuit 50 determines whether the AF-frame display setting is on or off. When the AF-frame display setting is on, the processing proceeds to the step S507; the AF frame 401 is displayed on the display unit 28, based on the setting value for the AF-area position. In the present embodiment, it is assumed that the AF frame 401 is displayed whose center coincides with the position corresponding to the setting value for the AF-area position. When the AF-frame display setting is off, the step S507 is skipped, and the AF frame is not displayed. In the step S508, the AF controller 42 implements AF operation, based on image data for an image (e.g., by means of contrast) within the AF frame 401. This concludes the explanation for a method of controlling the AF-area during the PHOTO mode.

In addition, in the AF operation described above, it has been explained that, with the shutter button 310 halfway depressed, the AF frame 401 can be shifted; however, shifting of the AF frame 401 is not limited to that method. For example, a so-called manual focusing mode may be implemented in which, during the PHOTO mode, the AF frame 401 is always displayed regardless of whether the shutter button 310 is depressed or not, and through predetermined operation, the AF frame 401 (corresponding to the position of the AF area) can always be shifted and set. In this case, in the step S503 described above, the AF-area position stored in the memory is the position that has been set during the manual focusing mode.

Figure 5:
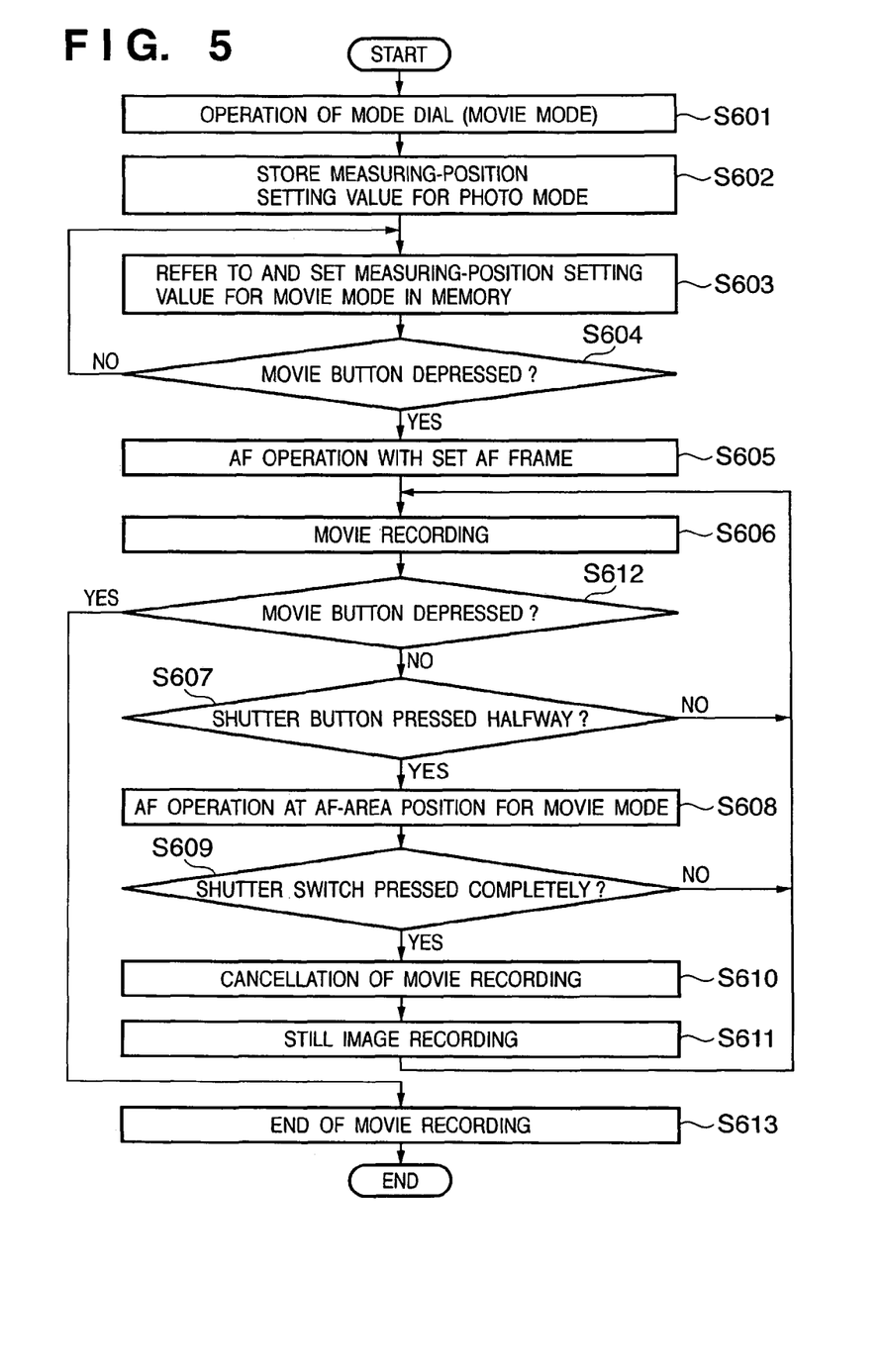
FIG. 5 is a flowchart for explaining shooting operation, during the movie recording mode, according to the present embodiment.

Next, the focus-control operation in movie recording during the MOVIE mode will be explained. FIG. 5 is a flowchart for explaining processing, according to the present embodiment, that is implemented by the system control circuit 50 during the MOVIE mode.

When, through the mode changeover switch 311, the MOVIE mode is designated, the processing proceeds from the step S601 to the step S602; the system control circuit 50 sets aside in a predetermined area within the memory 30 the setting value, for the AF-area position, that has been set in the PHOTO mode. This is because, in the case where the PHOTO mode is selected again, the AF-area position that has previously been set is restored.

Figure 3B:
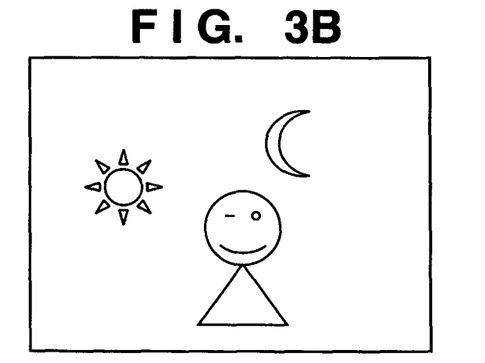
FIG. 3B is a view illustrating an example of a screen in the case of positional control of the AF area, during the movie recording mode.

Next, in the step S603, a setting value, stored in the memory 30, of the AF-area position for the MOVIE mode is set in the AF controller 42. Thereafter, until, in the step S604, the movie button 312 is depressed, the processing is on standby for movie recording. In the MOVIE mode, the AF-area position is in general fixed at the middle of the imaging field. However, as is the case with the PHOTO mode, the AF-area position set in the MOVIE mode may be shiftable to a desired position. In this case, the setting value for the AF-area position in the MOVIE mode is stored or overwritten in the memory 30. Moreover, as illustrated in FIG. 3B, the AF frame may not be displayed during the MOVIE mode. Alternatively, it may be enabled to set whether the AF frame is displayed or not, during the MOVIE mode.

When the movie button 312 is depressed, the processing proceeds from the step S604 to the step S605; the automatic focusing operation is implemented, in accordance with the setting value, of the AF-area position, for the MOVIE mode. Then, in the step S606, movie recording is started. When, during that movie recording, the movie button 312 is depressed again, the processing proceeds from the step S612 to the step S613; the system control circuit 50 ends that movie recording. In addition, the position of the AF area, in the MOVIE mode, that has been utilized in the step S605 is stored, as an AF-area position that is utilized in still image shooting during movie recording, in the memory area data in which has been set aside, in the step S602.

Figure 3C:
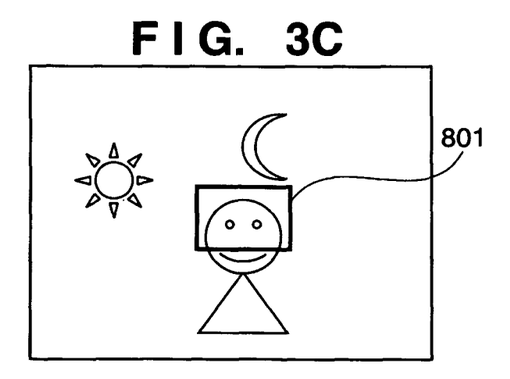
FIG. 3C is a view illustrating an example of a screen during the AF control, in the case where still image shooting is implemented during movie recording mode.

In this situation, by operating the shutter button 310 during the movie recording, still-image interrupt shooting can be implemented during movie recording. When, during movie recording, the shutter button 310 is halfway depressed, the processing proceeds from the step S607 to the step S608; the steps S503, and S506 to S508 in FIG. 4 are implemented. In this case, in the step S503, the AF-area position, for the MOVIE mode, that has been set in the step S605 is obtained from the memory 30. Additionally, when the AF-frame display setting is being set to ON, the processing proceeds from the step S506 to the step S507; as illustrated in FIG. 3C, an AF frame 801 indicating an still-image AF area that has been set at that AF-area position for the MOVIE MODE is displayed. Thereafter, in the step S508, the automatic focusing control for still-image shooting is implemented by utilizing that AF area. In addition, such an AF frame as the AF frame 801 illustrated in FIG. 3C may be displayed by all means in still image shooting during movie recording. Additionally, in order to indicate that still image shooting during movie recording is to be implemented, a sound may be made in addition to the display of the AF frame 801. When the condition of the shutter button 310 transits from being halfway pressed to being completely pressed, the processing proceeds from the step S609 to the step S610, in order to implement still-image shooting operation. In the step S610, the system control circuit 50 temporarily stops movie recording and, in the step S611, implements still image shooting. When the still image shooting ends, the processing returns to the step S606, and the movie recording is resumed. It is preferable to configure the electronic camera in such a way that, in this situation, the system control circuit 50 eliminates the AF frame 801. In other words, it is preferable that the AF frame 801 is displayed only when still image shooting during movie recording is implemented (from a halfway press to a complete press on the shutter button).

In addition, when, after the movie recording is ended in the step S613, the processing proceeds, through the mode changeover switch 311, to the PHOTO mode again, the system control circuit 50 makes the AF controller 42 cancel the setting value, for the AF-area position for still image shooting, that has been set in the MOVIE mode. Then, the system control circuit 50 makes the AF controller 42 restores the setting value, for the AF-area position, that has been set aside in the step S602.

In addition, in the case where, as illustrated in FIG. 6, the electronic camera is configured so as to be provided with a plurality of AF areas for still image shooting, AF frames (corresponding to the plurality of AF areas) are displayed, in the step S608, at the respective positions of AF areas that have been set in the MOVIE mode. In this case, in the step S602, information on which AF frame had been designated in the PHOTO mode has been set aside (saved). In the MOVIE mode, however, such saved information is not used and the automatic focusing control is implemented by automatically selecting one out of the plurality AF frames. In other words, even when one out of a plurality of AF frames has manually been selected in the PHOTO mode, an AF frame is automatically selected in the MOVIE mode. In addition, as methods of selecting an AF frame, selecting an AF frame in such a way that focus is implemented on the nearest position, or selecting an AF frame in such a way that the highest contrast is obtained, are enumerated.

In addition, in the foregoing embodiment, an AF area for still image shooting is set in accordance with the position of the AF frame for movie recording. For example, the AF area is set in such a way that the center thereof coincides with a photographic subject to be focused or the position of the image of a photographic subject to be focused. Additionally, in the case where, as illustrated in FIG. 6, a plurality of AF areas is provided, the AF areas may be set in such a way that the centers (centers of gravity) thereof coincide with a photographic subject to be focused or the position of the image of a photographic subject to be focused.

Note that in the above description, AF area in PHOTO mode is utilized as AF area in still image shooting in the MOVIE mode. The present invention is not limited to the above. For example, the size of AF area is specified for the PHOTO mode and for the MOVIE mode, respectively; in general, the size of an AF area in the MOVIE mode (an AF area for moving images) is larger than that of an AF area in the PHOTO mode (an AF area for still images). Accordingly, in the case where, as explained with reference to FIG. 3C, an AF frame having the same size as that of the AF frame in FIG. 3A is displayed, the size of an AF area in the MOVIE mode (in FIGS. 3B and 3C) is made larger than that of an AF area in the PHOTO mode. This is because the AF area is made large so that, in the MOVIE mode, the frequency is suppressed low at which a photographic subject moves into and out from the AF area. Moreover, this is because, if the AF area is small, a photographic subject is liable to move into and out from the AF area, whereby fluctuation of focus becomes frequent, thereby deteriorating visual impression. That is to say, in order to cope with the fact that, in the MOVIE mode, the process of focus tracking is recorded, priority is given to the visual impression. Still moreover, in still image shooting in the MOVIE mode, the size of an AF area is made larger than that of the AF area in normal still image shooting (for example, the same size as that in the MOVIE mode). This is because it is required that the same subject is focused both in the MOVIE mode and in the still image shooting in the MOVIE mode.

Figure 7A:
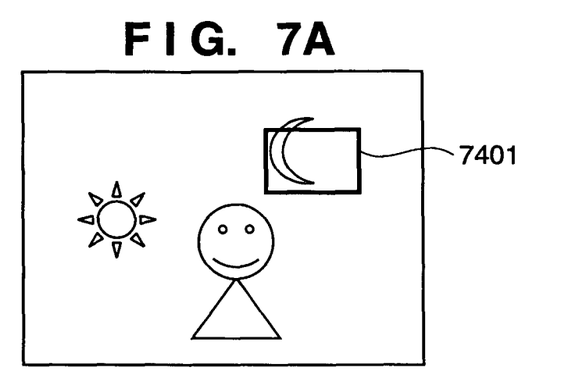
FIG. 7A is a view illustrating an example of a screen in the case of positional control of the AF area, during the still image mode.
Figure 7B:
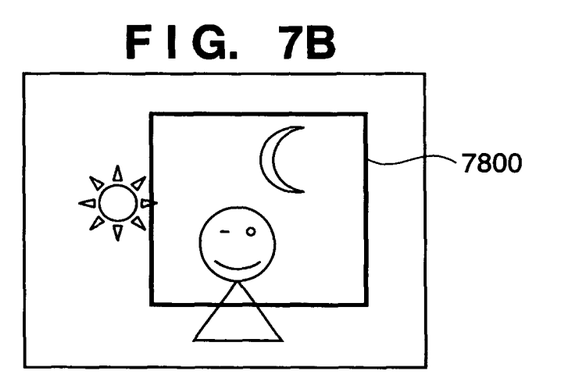
FIG. 7B is a view illustrating an example of a screen in the case of positional control of the AF area, during the movie recording mode.
Figure 7C:
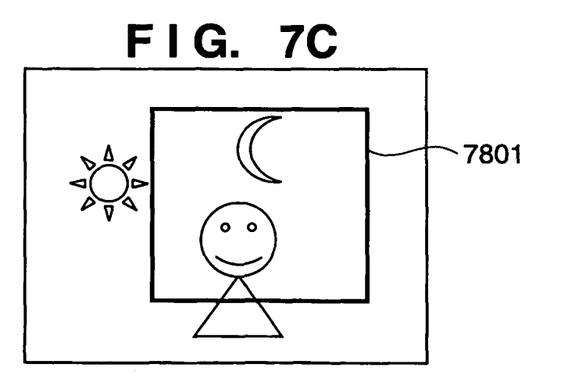
FIG. 7C is a view illustrating an example of a screen during the AF control in the case where still image shooting is implemented during movie recording mode.

The foregoing issue may be coped with a method as illustrated in FIGS. 7A to 7C. FIGS. 7A to 7C are views corresponding to FIGS. 3A to 3C with reference to which the foregoing explanation has been made. FIG. 7A is a view illustrating a screen image when the shutter button 310 is halfway depressed during the PHOTO mode. FIG. 7B is a view illustrating a screen image in the MOVIE mode. FIG. 3C is a view illustrating a screen image when the shutter button 310 is depressed during the MOVIE mode. In this situation, as illustrated in FIG. 7B, an AF frame 7800 is displayed also in the MOVIE mode; the AF frame 7800 is displayed in a larger size than that of an AF frame 7401 illustrated in FIG. 7A. An AF frame 7801 in the case of still image shooting in the MOVIE mode is larger than the AF frame 7401 in the PHOTO mode.

Figure 8A:
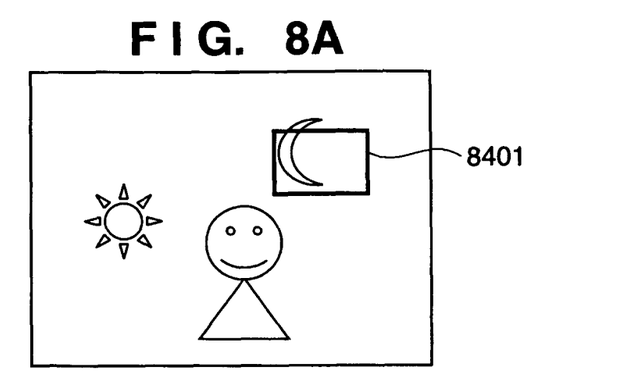
FIG. 8A is a view illustrating an example of a screen in the case of positional control of the AF area, during the still image mode.
Figure 8B:
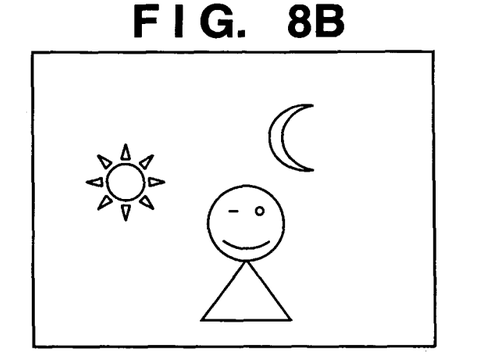
FIG. 8B is a view illustrating an example of a screen in the case of positional control of the AF area, during the movie recording mode.
Figure 8C:
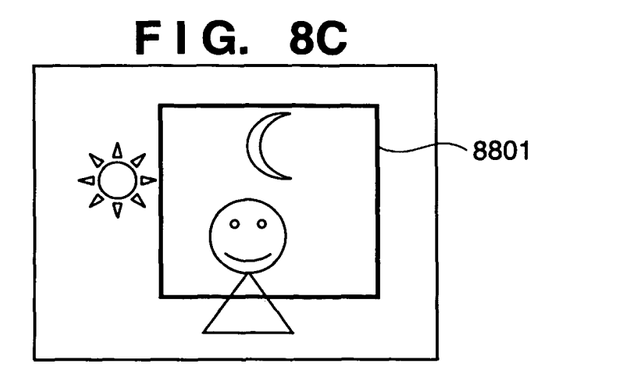
FIG. 8C is a view illustrating an example of a screen during the AF control in the case where still image shooting is implemented during movie recording mode.

Moreover, the foregoing issue may be coped with a method as illustrated in FIGS. 8A to 8C. FIGS. 8A to 8C are views illustrating an example in which, in the MOVIE mode illustrated in FIG. 7B with reference to which explanation has made, the AF area is enlarged, without displaying the AF frame 7800. An AF frame 8801 in the case of still image shooting in the MOVIE mode is also larger than the AF frame 8401 in the PHOTO mode.

In the foregoing embodiment, the AF frame indicating an AF area is displayed on the image display unit 28; however, the AF frame indicating an AF area may be displayed on the optical viewfinder 104. Additionally, as a method of indicating the AF area to the user, the AF area may be displayed, not only by means of a frame but also by means of a dot. In the case of still image shooting, the user is informed, through the display, about which AF area is focused; in contrast, during movie recording, by eliminating the display, the visibility of electronic viewfinder and the optical viewfinder 104 can be enhanced.

As described above, according to the foregoing embodiment, in still image shooting, during movie recording, in the MOVIE mode, after an AF area for still image shooting is set at the AF-area position that has been set in the MOVIE mode, regardless of the AF-area position that has been set during still image shooting in the PHOTO mode, the automatic focusing is implemented. That is to say, in an imaging apparatus in which, in still image shooting in the PHOTO mode, the AF-area position can arbitrarily be set, in the case of still image shooting during movie recording, automatic focusing control for the still-image shooting is implemented, based on an AF-area position for movie recording. Accordingly, in still image shooting during movie recording, an intended focus condition can readily be obtained, whereby operability is raised.

For example, in movie recording, because, in most cases, a main photographic subject is typically displayed at the middle of video area, it is desirable that the AF-area position is set in a central area. In other words, it is conceivable that, even in the case of still image shooting during movie recording, the position of the main photographic subject does not change. In the present embodiment, as is the case where movie recording is implemented, the AF-area position is set at the central area, and as is the case where still image shooting is implemented, only a narrow target area is focused; therefore, a desired focus condition can be obtained whose accuracy is as high as the accuracy that is required for still image shooting.

Moreover, according to the present embodiment, in still image shooting during movie recording, an AF-area is transformed from the one for movie recording to the one for still image shooting, while a photographic subject to be focused or the position of the image of a photographic subject to be focused is maintained; therefore, high-accuracy focus control can be realized that is required for still image shooting. Still moreover, because, in still image shooting during movie recording, an AF area is displayed, the user can readily focus on a desired photographic subject, as if normal still image shooting were implemented. Further moreover, according to the present embodiment, multiple-point AF as illustrated in FIG. 6 can also be coped with.

As explained heretofore, with an imaging apparatus according to the present invention, in the case where still image shooting is implemented during movie recording, the user can readily focus his intended area.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-123986, filed on Apr. 21, 2005, which is hereby incorporated by reference herein in its entirety.

What is claimed is:

1. An imaging apparatus that enables still image shooting in a movie recording mode, the imaging apparatus comprising:
    an AF area setting controller configured to set a first AF area in a still image shooting mode, to set a second AF area in the case where still image shooting in the movie recording mode, and to set a third AF area in the movie recording mode, each of the second and third AF areas being larger than the first AF area; and
    a focusing controller configured to control a focus state of an image based on a signal corresponding to an AF area in an image set by said AF area setting controller,
    wherein the second AF area is a part of an entire frame of the image and a size of the second AF area is equal to a size of the third AF area, and
    wherein the AF area controller sets the first AF area at an arbitrary position in the image and sets the second AF area at the same position of the third AF area by obtaining the position information of the third AF area from a memory.

2. The imaging apparatus according to claim 1, wherein, in the case where, the still image shooting mode is resumed after a changeover occurs from the still image shooting mode to the movie recording mode, focus is controlled by utilizing the first AF area set by said focusing controller.

3. The imaging apparatus according to claim 1, wherein said focusing controller is configured to control focus based on image information in the second AF area.

4. The imaging apparatus according to claim 3, further comprising a display controller configured to display the AF area, and
    wherein, while implementing focus control, said display controller displays an AF frame indicating an AF frame corresponding to an AF area for the still image shooting on a viewfinder.

5. The imaging apparatus according to claim 3, wherein said focusing controller implements focus control, based on image information for the entire area in the second AF area.

6. The imaging apparatus according to claim 1, wherein a mark indicating the second AF area is larger than a mark indicating the first AF area.

7. The imaging apparatus according to claim 1, wherein a mark indicating the second AF area is the same in size as a mark indicating the first AF area.

8. An imaging method accomplished by an imaging apparatus that enables still image shooting in a movie recording mode, the imaging method comprising:
    an AF area setting step of setting, using an AF area controller, a first AF area in a still image shooting mode, setting a second AF area in the case where still image shooting in the movie recording mode, and setting a third AF area in the movie recording mode, each of the second and third AF areas being larger than the first AF area; and
    a focusing step of controlling a focus state of an image based on a signal corresponding to an AF area in an image set in said AF area setting step,
    wherein the second AF area is a part of an entire frame of the image and a size of the second AF area is equal to a size of the third AF area, and
    wherein in the AF area setting step, the first AF area is set at an arbitrary position in the image and the second AF area is set at the same position of the third AF area by obtaining the position information of the third AF area from a memory.

* * * * *